United States Patent [19]
Nilssen

[11] Patent Number: 5,083,782
[45] Date of Patent: * Jan. 28, 1992

[54] FINANCIAL INSTRUMENTS AND SYSTEMS

[76] Inventor: Ole K. Nilssen, Caesar Dr., Barrington, Ill. 60010

[*] Notice: The portion of the term of this patent subsequent to Mar. 5, 2008 has been disclaimed.

[21] Appl. No.: 608,679

[22] Filed: Nov. 5, 1990

Related U.S. Application Data

[63] Continuation-in-part of Ser. No. 537,141, Jun. 13, 1990, Pat. No. 4,997,188, which is a continuation of Ser. No. 305,543, Feb. 3, 1989, abandoned, which is a continuation-in-part of Ser. No. 118,000, Nov. 9, 1987, abandoned.

[51] Int. Cl.$^5$ .................. A63B 71/00; G06F 15/20
[52] U.S. Cl. ..................... 273/138 R; 273/138 A; 364/408
[58] Field of Search ............... 273/138 R, 138 A; 434/107; 364/408, 412

[56] References Cited

U.S. PATENT DOCUMENTS 4,997,188  3/1991  Nilssen ..................... 272/138 R

OTHER PUBLICATIONS

"Scarne's New Complete Guide to Gambling", by John Scarne, Pub. Simon & Schuster, ®1961, 1974, p. 146 Relied On.
"Financial Tools Used in Money Management" by Joyce Pitts, Pub. U. S. Dept. of Agriculture Oct. 1986, p. 2 and 2.3–2.5 relied on.

Primary Examiner—William H. Gribb
Assistant Examiner—Raleigh Chiu

[57] ABSTRACT

A financial institution, such as a bank, issues numerous uniquely coded certificates to various individual entities in exchange for monetary value received. The holder of each certificate is entitled to receive a certain average rate of income from the monetary value represented by that certificate; which average rate of income would generally be proportional to prevailing interest rate as well as to the monetary value represented by the certificate. To avoid the relatively high transaction costs associated with periodic payments of a relatively modest income to the holder of each of numerous individual certificates, a statistical method is used. By way of this statistical method, a relatively few of the numerous uniquely coded certificates are randomly chosen at the end of each of a continuous sequence of time periods, and all the income attributable to all the issued certificates for the associated time period is then paid to the holders of the relatively few certificates chosen for that time period. Alternatively, the earnings resulting from the monetary values received are simply retained and added to the total fund of money underlying the certificates, thereby causing the monetary value of each certificate to grow over time. Thus, the total earnings attributable to a given certificate is continuously cumulated and added to the value represented by that certificate.

16 Claims, 1 Drawing Sheet

FINANCIAL INSTRUMENTS AND SYSTEMS

RELATED APPLICATIONS

This application is a continuation-in-part of Ser. No. 07/537,141 filed Jun. 13, 1990, now U.S. Pat. No. 4,997,188; which was a continuation of Ser. No. 07/305,543 filed Feb. 3, 1989, now abandoned; which was a continuation-in-part of Ser. No. 07/118,000 filed Nov. 9, 1987, now abandoned.

BACKGROUND OF THE INVENTION

1. Field of the Invention

This invention relates to financial certificates, such as monetary-equivalent certificates and/or travelers checks, and various systems for making such financial certificates more valuable to the holders thereof.

2. Description of Prior Art

Monetary certificates, travelers checks, etc. constitute familiar financial instruments. A person desiring to purchase monetary certificates of a given type (such as the currency of a foreign country), and/or travelers checks, simply goes to the local bank and purchases the desired monetary certificates and/or travelers checks.

The business of issuing monetary certificates and/or travelers checks is a highly profitable one for the issuing entity. This is so for the main reason that, on the average, the issued monetary certificates and/or travelers checks remain un-redeemed for a substantial period of time; during which time the issuing agency derives interest income from the monetary (or other) values having been tendered for the issued but not-yet-redeemed certificates and/or checks.

For instance, with respect to travelers checks, American Express Company of New York, NY—which is the largest issuer of travelers checks in the USA—reportedly carries a float of several billion dollars resulting from issued but as-yet-unredeemed travelers checks. At an interest rate of 10% p.a., a profit of several hundred million dollars per year is indicated.

SUMMARY OF THE INVENTION

Identification/Definition of Certain Basic Facts and Terms

Dollar bills, foreign currency bills, ordinary (personal) checks, travelers checks, stock certificates, bonds, etc. represent various forms of financial instruments; and, to the extent they are represented by a certificate means (or its equivalent), they may all be considered as various forms of money-equivalent or monetary-equivalent certificates. Some of these financial instruments provide for earnings (such as interest from municipal bonds or dividends from corporate stock certificates), others (such as dollar bills or foreign currency bills) do not.

Objects of the Invention

A general object of the present invention is the provision of a system for issuing and administering an improved type of financial or monetary-equivalent certificates (such as travelers checks) that would—in comparison with various existing monetary or financial certificates—represent increased value for the holders of such improved financial certificates.

A more specific object is the provision of systems for providing monetary-equivalent certificates (such as travelers checks) that yield interest (or its equivalent) to the holders thereof, yet without incurring substantial transaction costs.

These as well as other objects, features and advantages of the present invention will become apparent from the following description and claims.

BRIEF DESCRIPTION

A financial institution, such as a bank, issues a large number of uniquely coded monetary-equivalent certificates (such as travelers checks) to various individual entities in exchange for monetary or other values received. Each monetary-equivalent certificate is identified as representing a specific monetary-equivalent value. The holder of each monetary-equivalent certificate is entitled to receive a certain average rate of income from the monetary-equivalent value represented by that certificate; which average rate of income would generally be proportional to prevailing interest rates as well as to the monetary-equivalent (i.e., dollar) value represented by the certificate.

To avoid the relatively high transaction costs associated with periodic payments of a relatively modest amount of income to the holders of each of the numerous uniquely coded monetary-equivalent certificates, a statistical method is used. By way of this statistical method, a relatively few certificates are randomly chosen at the end of each of a continuous sequence of time periods, and all the income attributable to all the issued monetary-equivalent certificates for the associated time period is then paid to the holders of the relatively few such certificates chosen for that time period.

Thus, each holder of a monetary-equivalent certificate will, on a probabilistic basis, receive an income from that certificate.

As a result, such a monetary-equivalent certificate becomes a much more attractive financial instrument as compared with ordinary monetary-equivalent certificates, such as travelers checks, domestic or foreign currencies, etc.

As an alternative to paying-out (via statistical means) all (or most of) the earnings derived from investing the dollar-equivalent values received in exchange for (and therefore underlying) the issued monetary-equivalent certificates, all (or most of) these earnings can be added to the totality of the invested dollar-equivalent values, thereby cumulatively increasing the value underlying each certificate; which, therefore, will gradually increase in value compared to its initial value.

More particularly, in a preferred embodiment, subject financial certificates and system comprise the following key steps and component parts:

(1) a central issuing entity operative, in return for dollar-equivalent value received, to issue to each of various individual entities a number of uniquely coded monetary-equivalent certificates (such as travelers checks), thereby in total having issued a large number of such certificates;

(2) a utilization entity functionally connected with the central issuing entity and operative to utilize the dollar-equivalent values received by this central issuing entity and to generate a rate of income of additional dollar-equivalent values, this rate of income cumulating and providing for a disbursement fund; and (3) a random-choice and disbursement entity functionally connected with the central issuing entity; the utilization entity, and the various individual entities, the random-choice and disbursement entity being operative for each of plural time periods to randomly choose one of the large number of uniquely coded monetary-equivalent certificates and to make a relatively large disbursement from the disbursement fund to the individual entity holding the chosen certificate.

DESCRIPTION OF THE PREFERRED EMBODIMENT

Details of Construction

Figure 1:
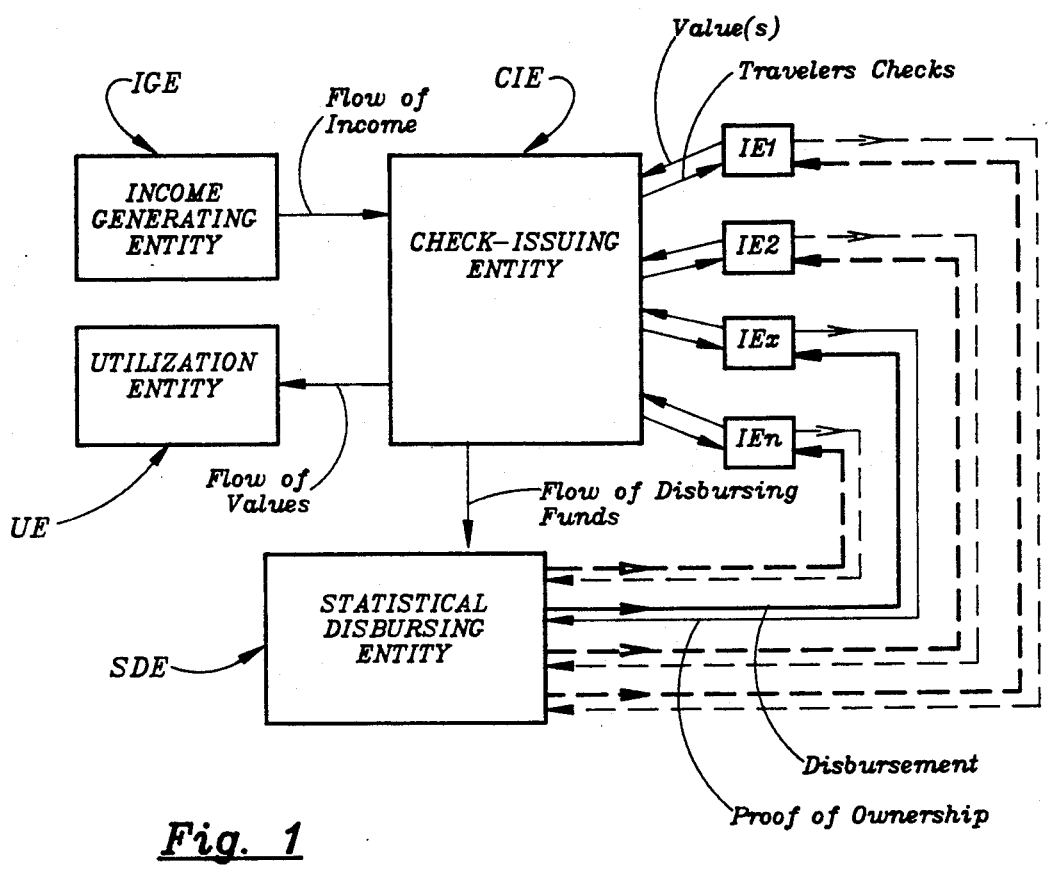
FIG. 1 diagrammatically illustrates the preferred embodiment of the invention.

FIG. 1 is a combination systems-process diagram that illustrates the system operative to effectuate the process of the present invention.

In FIG. 1, numerous individual entities are identified as IE1, IE2 . . . IEx . . . IEn; each of which numerous individual entities—at one time or another—is operationally connected with a check-issuing (or certificate-issuing) entity CIE as well as with a statistical disbursing entity SDE. The check-issuing entity CIE is operationally connected with an income-generating entity IGE and a utilization entity UI as well as with the statistical disbursing entity SDE.

Details of Operation

Numerous individual entities (IE1/IE2/IEx/IEn) will, at one time or another, interact with the check-issuing entity CIE in such manner as to convey to it one or more units of dollar-equivalent value in exchange for one or more uniquely coded travelers checks and/or other monetary-equivalent certificates. Each such uniquely coded travelers check or certificate is identified in a manner that reflects the amount of dollar-equivalent value for which it was exchanged.

The check-issuing (i.e., certificate-issuing) entity CIE keeps account of all the uniquely coded travelers checks (i.e., financial certificates) exchanged by it in return for dollar-equivalent values received from the various individual entities; and transmits information with respect to key characteristics of these travelers checks, such as identification code and value denominations, to the statistical disbursing entity SDE.

The check-issuing (certificate-issuing) entity CIE conveys to the utilization entity UE the dollar-equivalent values it has received in exchange for travelers checks; while it receives a flow of income from the income-generating entity IGE. At least part of this flow of income is conveyed to the statistical disbursing entity SDE to be placed into a disbursement fund.

Periodically and repeatedly, preferably once each week, the statistical disbursing entity SDE randomly selects the identification codes of a relatively few of the numerous issued travelers checks and accredits each chosen identification code with a substantial amount of funds from the disbursement fund. Thereafter, the statistical disbursing entity arranges to inform the holders of the issued travelers checks with respect to the chosen identification codes and the amount of funds accredited thereto.

Upon verification to such effect, each holder of a travelers check (or financial certificate) bearing one of the chosen identification codes is entitled to obtain from the statistical disbursing entity the total amount of funds accredited to the identification code of that check.

Thus, the process of randomly choosing a few identification codes and making a substantial disbursement to each of the holders of the travelers checks bearing the chosen codes is carried out on a substantially continuous basis; which means that each individual travelers check represents a continuously repeating opportunity to receive a substantial disbursement of funds.

In the above-described preferred embodiment, the rate of funds disbursed by the statistical disbursing entity to the holders of travelers checks is such as, on the whole, to represent a fair return on the dollar-equivalent values exchanged therefor; which is to say that, on a statistical basis, each travelers check (i.e., financial certificate), regardless of its denomination, earns an interest substantially commensurate with its face value (or the equivalent thereof) as well as with the currently prevailing interest rate.

The value associated with a travelers check (i.e., a financial certificate) might be as low as equivalent to about $10.00. To cost-effectively permit the holders of such low-value travelers checks to gain a relatively high rate of return, only one out of one million travelers checks would be chosen each week; and the chosen one-in-a-million check would receive the total interest earned by the funds received for one million such low-value checks for one week. At an annual interest rate of 10%, the weekly earnings on one million such low-value checks would be about $20,000; which would then be the pay-out associated with the one low-value travelers check chosen each week.

Of course, with respect to travelers checks of higher value, correspondingly higher pay-outs, and/or higher chances for being chosen for pay-outs, would prevail.

In the above-described preferred embodiment, instead of disbursing all of the earnings (derived from the income-earning investment of the dollar-equivalent values having been received from the various individual entities in exchange for financial certificates) to the holders of these financial certificates, at least some (or even all) of these earnings could be added to the totality of the income-earning investment, thereby giving rise to an ever-increasing total investment pool underlying (i.e., represented by) the issued financial certificates; which means that the value of each such financial certificate will correspondingly increase. Thus, if a given financial certificate is bought for a certain dollar-amount at a certain time, that same financial certificate would be worth more in terms of dollars at some later time; which implies that this financial certificate would represent a true value that would grow with time, normally at a rate in excess of the inflation rates associated with ordinary monetary currencies. In fact, with an appropriately conservative underlying investment pool, this particular type of certificate would constitute a highly desirable certificate of value that would be far more desirable to hold (i.e., save) than the monetary certificates issued by most national governments.

In fact, it is anticipated that the various issuing entities (the world over) would provide for daily quotation of the "exchange rate" of a basic (i.e., unit) financial certificate in term of dollars and/or other national currencies.

Additional Comments (a) To a person of ordinary skill in the arts most nearly relevant hereto, it will be clear that all the functions associated with the various functional blocks of the systems-process block diagram of FIG. 1 may be performed by automatic means, such as by way of pre-programmed computer and dispenser means. For instance, an automatic teller machine may accept small dollar amounts from an individual entity or person and issue to him receipts and/or travelers checks in exchange therefor—each receipt and/or travelers check having a unique identification code.

Alternatively, some or all of the various functions may be accomplished by persons of ordinary skills by simply following clearly specifiable procedures.

(b) It is expected that the check-issuing entity will, by way of the utilization entity, invest the revenues received from the sale of travelers checks in various large blocks of income-producing financial instruments, such as large-denominations government bonds, shares of corporate capital stock, shares of or in mutual funds, etc.

(c) The income-generating entity (IGE) and the utilization entity (UE) may be one and the same, namely one or more profit-producing organizations, such as industrial corporations, mutual funds, etc. The flow of income to the money-issuing entity (MIE) would then come from the profits of those profit-producing organizations.

(d) After a very large number of travelers checks have been issued, to provide for an increased level of perceived value (such as by providing for a significant degree of lottery-like excitement), one of the periodically chosen identification codes would be accredited with a particularly high pay-out, such as several million dollars. This increased pay-out would be counter-balanced by somewhat reduced pay-outs to the other chosen identification codes.

(e) It is anticipated that the travelers checks will be of at least two different types. One type would permit the individual owner to be specifically identified; another type would be in the form of bearer certificates requiring special coded identification for redemption by the bearer.

(f) It is also anticipated that subject Dividend-Paying Travelers Checks may be furnished in a version that is, in effect, pre-endorsed and usable as cash. As such, they would expectedly become widely accepted: becoming as liquid and tradeable as ordinary money. In effect, they would constitute interest-bearing money.

Hence, it would be reasonable to expect that a large number of people would simply prefer to convert all of their available cash funds into such Dividend-Paying Travelers Checks.

(g) In case the holder of a travelers check with a chosen identification code chooses not to or otherwise fails to collect the funds accredited to that chosen identification code, the probability of that particular identification code being chosen in the future will be adjusted upward by a factor equal to the factor by which the amount of uncollected funds exceeds the value of the chosen travelers check.

More particularly by way of example, if a given travelers check is valued at the equivalent of $10, and if at one point in time that check were chosen to be accredited with an amount of $2000, then—for as long as the accredited amount remains uncollected—this particular check would partake in future random choosings with a probability of being chosen that is 201 higher than it was before.

(h) The process herein described in connection with travelers checks may also be applied to situations wherein the funds supplied by the various individual entities (individuals) are not represented by a physical check or certificate means. Rather, the process and system is also applicable to situations where the money provided by an individual is simply turned over to the check-issuing entity (or its simili) in return for some form of receipt and placed in an account held in the name of that particular individual. Interest and/or dividends would then be paid to this individual on a statistical basis; and such interest and/or dividends would then simply be accredited to his account.

Thus, the process and system herein described is applicable to such situations as:

(1) Paying interest on passbook or similar bank savings accounts;

(2) Paying interest on balances in credit and/or debit card accounts;

(3) Paying interest on balances in personal and/or small company checking accounts;

(4) Disbursement of dividends payable on small lots of corporate capital stock;

(5) Payments of dividends and/or interest on accounts with stock brokers and/or mutual funds;

(6) Paying interest/dividends on outstanding money orders, not-yet-redeemed checks; etc.

In all these situations, by using the principle of paying dividends and/or interest by way of a statistical distribution method, a basic value to each account holder is virtual elimination of the relatively high transaction costs associated with small transactions, thereby permitting higher effective interest and/or dividends to be paid to the account holder while at the same time eliminating all the detailed record-keeping otherwise incumbent upon him. In addition, a high degree of lottery-like excitement is provided.

(i) One very important feature of the Dividend-Paying Travelers Checks herein described is that they need not be redeemable. That is, they can be made to function perfectly well without the mechanism of redemption.

This fact permits the operation associated with issuing travelers checks to include many more options in terms of investments suitable as underlayment of the requisite dividend payments.

With non-redeemable travelers checks, the value of the travelers check would be entirely based on its dividend-paying feature; which would imply that an issued travelers check will have a value that would be determined by a market mechanism, somewhat like a stock certificate. In other words, the value of such a travelers check would be apt to fluctuate somewhat; but, as long as dividend payments are upheld, it would clearly have a value.

By maintaining the dividend payments at a substantially constant level, the market value of such a travelers check would fluctuate with the interest rate.

By increasing (or decreasing) the dividend payments in accordance with the inflation rate, the market value (in dollars) of such a travelers check would increase (or decrease) accordingly.

By increasing the dividend payments at a rate higher than the inflation rate, the market value of such a travelers check would increase at a rate higher than inflation.

In any case, its utility as a travelers check would be maintained: its trading value would simply be established by market mechanisms.

Of course, the price of a travelers check from the issuer would also be determined by market mechanisms.

(j) It is anticipated that, as a variation of the invention herein disclosed, the financial certificates may be termed Merchandise Certificates, and—instead of representing ownership of a part of an underlying pool of income-earning investments—they would represent ownership of a part of a collection of merchandise (i.e., a "basket" of merchandise), such as the merchandise normally or typically kept in inventory by one or a combination of several merchandising and/or manufacturing organizations, such as Sears, Roebuck and Co. (herein after "Sears").

By way of specific example, Sears (by itself or in combination with other firms) could issue Merchandise Certificates redeemable at any time in a certain predefined amount of goods; each Merchandise Certificate representing ownership of a certain part of Sears' inventory. By suitable pre-arrangement, each Merchandise Certificate could be arranged such as to represent a constant real value, non-affected by inflation. Then, in return for the use of the certificate-holder's money, Sears would arrange to pay an interest in the statistical lottery-like manner described elsewhere herein.

Thus, a merchandise organization could arrange to have part or all of its inventory or merchandise funded by money received from various purchasers of Merchandise Certificates—with the organization's inventory being the basic security underlying these Certificates.

(k) It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

Definition

In this application, in accordance with conventional usage, the term "financial certificate" is considered as a broad generic term for a certificate certifying some form of financial right and/or obligation. Thus, for instance: an ordinary traveler's check (such as an American Express Travelers Cheque) is a financial certificate; a share of capital stock of an industrial corporation (i.e., a common stock certificate) is a financial certificatee; a monetary certificate of some sovereign nation (such as a dollar bill) is a financial certificate; even a merchandise gift certificate may reasonably be considered as a financial certificate.

Thus, a travelers check (or traveler's check) is merely an example of a financial certificate.

I claim:

1. A financial services system comprising:
    first means operative to issue to each of a number of individual entities a financial certificate in exchange for an amount of dollar-equivalent value; the financial certificate being identified by a unique identification code; each individual entity becoming a holder of a financial certificate;
    second means functionally connected with the first means and operative to receive from the first means the dollar-equivalent values having been received by the first means in exchange for issued financial certificates, and to accumulate the received dollar-equivalent values into a pool of dollar-equivalent funds; each financial certificate signifying ownership of a certain part of this pool of dollar-equivalent funds; the second means being operative to invest at least a significant part of the pool of dollar-equivalent funds in various income-producing financial instruments, thereby to give rise to a flow of dollar-equivalent income; at least a substantial part of the flow of dollar-equivalent income being added to the pool of dollar-equivalent funds, thereby to cause this pool to grow in total dollar-equivalent value over time, thereby as well to cause the dollar-equivalent value of each financial certificate to grow over time; and
    third means functionally connected with the second means and operative at a given time, upon demand and in exchange for a financial certificate, to transfer to the holder of this financial certificate the amount of dollar-equivalent value represented by this financial certificate at that given time;
    whereby the financial certificates will be backed by income-producing values and will therefore increase in dollar-equivalent value over time.

2. The financial services system of claim 1 combined with a fourth means functionally connected with the second means and operative periodically: (i) to randomly select one of the unique identification codes; and (ii) to credit to the holder of the particular financial certificate bearing the chosen identification code an amount of dollar-equivalent value.

3. The financial services system of claim 2 wherein: (i) the random selection of one of the unique identification codes occurs repeatedly, with a certain time-interval between each occurrence; and (ii) said amount of dollar-equivalent value represents not more than the dollar-equivalent income generated by the pool of dollar-equivalent funds during the certain time-interval.

4. A financial services system comprising:
    first means operative, in exchange for an amount of dollar-equivalent value received from each one of a plurality of individual entities, to issue to each such one individual entity a financial certificate; each such financial certificate having a unique identification code; and
    second means operative: (i) to receive from the first means a substantial fraction of the dollar-equivalent values received by it in exchange for the financial certificates issued by it; (ii) to cumulate these dollar-equivalent values such as to form a pool of dollar-equivalent funds; (iii) to invest at least a substantial portion of this pool of dollar-equivalent funds in various income-generating financial instruments, thereby to generate a dollar-equivalent income stream; and (iv) to add at least a significant part of this dollar-equivalent income stream to the pool of dollar-equivalent funds, thereby to cause the total dollar-equivalent value of this pool to increase over time;
    such that: (i) each financial certificate represents ownership of a certain part of the pool of dollar-equivalent funds; and (ii) the dollar-equivalent value of each financial certificate increases over time.

5. The financial services system of claim 4 combined with a third means functionally connected with the second means and operative each time after a time-interval: (i) to randomly chose one of the unique identification codes; (ii) to allocate a certain amount of dollar-equivalent value to the particular financial certificate having the chosen identification code; and (iii) on presentation of the financial certificate having the chosen identification code, to transfer said certain amount of dollar-equivalent value to the bearer of this particular financial certificate.

6. The system of claim 5 wherein said certain amount of dollar-equivalent value is not substantially higher than the total income having been generated by the pool of dollar-equivalent funds during said time-interval.

7. The financial services system of claim 4 combined with a third means functionally connected with the second means and operative periodically: (i) to randomly chose one of the unique identification codes; (ii) to issue a certain number of new financial certificates to the particular financial certificate having the chosen identification code; and (iii) on presentation of the financial certificate having the chosen identification code, to transfer said certain number of new financial certificates to the bearer of the financial certificate having the chosen identification code.

8. The financial services system of claim 4 wherein the various income-generating financial instruments include a diverse collection of financial securities issued by a variety of financially responsible entities, including various commercial corporations.

9. The financial services system of claim 4 wherein the various income-generating financial instruments include a diverse collection of the financial securities listed on the various stock exchanges of the world.

10. The financial services system of claim 4 wherein the various income-generating financial instruments include a diverse collection of financial securities, such as those listed in 1990 on the New York Stock Exchange.

11. The financial services system of claim 4 wherein the various income-generating financial instruments include a diverse collection of the financial securities such as those usually quoted by the Wall Street Journal during the year 1990.

12. A financial services system comprising:
(A) a total number of financial certificates; each financial certificate: (i) having a unique identification code; (ii) representing ownership of a certain part of a total collection of a variety of different income-generating financial securities; and (iii) having a dollar-equivalent value that increases over time;
(B) issuing means operative, in exchange for an amount of dollar-equivalent values, to issue one or more such financial certificates to each of a plurality of individual entities;
(C) investment means functionally connected with the issuing means and operative: (i) to cumulate into a pool of dollar-equivalent funds at least some of the dollar-equivalent values received by the issuing means in exchange for issuing financial certificates; (ii) to invest this pool of dollar-equivalent funds in various income-generating financial securities, thereby to generate a stream of dollar-equivalent income; and (iii) to apply at least a fraction of this stream of dollar-equivalent income to the pool of dollar-equivalent funds, thereby over time to cause the total dollar-equivalent value of this pool to increase; and
(D) disbursement means functionally connected with the investment means and operative at some given point in time, in exchange for receiving a given financial certificate from a certificate-holding entity, to transfer to that certificate-holding entity an amount of dollar-equivalent value substantially equal to the total dollar-equivalent value of the pool of dollar-equivalent funds at said point in time divided by the total number of financial certificates.

13. The financial services system of claim 12 combined with a statistical selection means functionally connected with the investment means and the disbursement means; the statistical selection means being operative, each time after a given period of time, to statistically select one of the unique identification codes and to allocate a certain amount of dollar-equivalent value to the particular financial certificate having the selected code;
such that, upon presentation of the particular financial certificate having the selected code, the certificate-holding entity presenting that particular financial certificate will receive said certain amount of dollar-equivalent value.

14. The financial services system of claim 13 wherein said certain amount of dollar-equivalent value does not exceed the dollar-equivalent value of the income stream having flowed over said given period of time.

15. A financial services system comprising:
first means operative to issue to each of a number of individual entities a financial certificate in exchange for an amount of dollar-equivalent value; the financial certificate being identified by a unique identification code; each individual entity becoming a holder of a financial certificate;
second means functionally connected with the first means and operative to receive from the first means the dollar-equivalent values having been received by the first means in exchange for issued financial certificates, and to accumulate the received dollar-equivalent values into a pool of dollar-equivalent funds; each financial certificate signifying ownership of a certain part of this pool of dollar-equivalent funds; the second means being operative to invest at least a significant part of the pool of dollar-equivalent funds in various income-producing financial instruments, thereby to give rise to a flow of dollar-equivalent income; at least a substantial part of the flow of dollar-equivalent income being added to the pool of dollar-equivalent funds, thereby to cause this pool to grow in total dollar-equivalent value over time, thereby as well to cause the dollar-equivalent value of each financial certificate to grow over time; and
third means functionally connected with the second means and operative at a given time, upon demand and in exchange for a given financial certificate, to transfer to the holder of this given financial certificate the amount of dollar-equivalent value represented by this given financial certificate at that given time;
whereby the financial certificates will be backed by income-producing values and will therefore increase in dollar-equivalent value over time.

16. A financial services system comprising:
first means operative to issue to each of a number of individual entities a financial certificate in exchange for an amount of dollar-equivalent value; the financial certificate being identified by a unique identification code; each individual entity becoming a holder of a financial certificate;
second means functionally connected with the first means and operative to receive from the first means the dollar-equivalent values having been received by the first means in exchange for issued financial certificates, and to accumulate the received dollar-equivalent values into a pool of dollar-equivalent funds; the second means being operative to invest at least a significant part of the pool of dollar-equivalent funds in various income-generating financial instruments, thereby to form a collection of such income-generating financial instruments; each financial certificate constituting proof of ownership of a certain fraction of this collection of financial instruments; each fraction of the collection of financial instruments growing in dollar-equivalent value over time, thereby to cause the dollar-equivalent value of each financial certificate to grow over time; and third means functionally connected with the second means and operative at a given time, upon demand and in exchange for a given financial certificate, to transfer to the holder of this given financial certificate the amount of dollar-equivalent value represented by this given financial certificate at that given time;

whereby the financial certificates will be backed by income-generating financial instruments and will therefore increase in dollar-equivalent value over time.

* * * * *